(12) United States Patent
Rawson et al.

(10) Patent No.: US 8,114,659 B2
(45) Date of Patent: Feb. 14, 2012

(54) APPARATUS AND METHOD FOR CATALYTIC TREATMENT OF A MEDIA

(76) Inventors: Robert William Rawson, Sebastopol, CA (US); Mia Rose Maltz, Forestville, CA (US)

( * ) Notice: Subject to any disclaimer, the term of this patent is extended or adjusted under 35 U.S.C. 154(b) by 412 days.

(21) Appl. No.: 12/353,914

(22) Filed: Jan. 14, 2009

(65) Prior Publication Data

US 2010/0233788 A1   Sep. 16, 2010

Related U.S. Application Data (60) Provisional application No. 60/010,990, filed on Jan. 14, 2008, provisional application No. 61/144,439, filed on Jan. 13, 2009.

(51) Int. Cl.
*A62D 3/00* (2007.01)
*A62D 3/02* (2007.01)
*B09B 3/00* (2006.01)
*B09C 1/10* (2006.01)

(52) U.S. Cl. ............... 435/262.5; 435/298.1; 435/299.1; 210/150; 210/151

(58) Field of Classification Search ............... 435/299.1, 435/262.5, 298.1; 210/150, 151
See application file for complete search history.

(56) References Cited

U.S. PATENT DOCUMENTS

| | | | |
|---|---|---|---|
| 3,577,678 A | 5/1971 | Burton | |
| 3,616,204 A | 10/1971 | Linn | |
| 3,676,357 A | 7/1972 | Ciuti | |
| 3,769,164 A | 10/1973 | Azarowicz | |
| 3,856,667 A | 12/1974 | Azarowicz | |
| 3,875,008 A | 4/1975 | Yoshino | |
| 3,917,814 A | 11/1975 | Hedges | |
| 4,001,085 A | 1/1977 | Keyes | |
| 4,005,010 A | 1/1977 | Lunt | |
| 4,039,437 A * | 8/1977 | Smith et al. | ............. 210/607 |
| 4,077,877 A | 3/1978 | Orensten | |
| 4,086,167 A | 4/1978 | Tapola | |
| 4,094,097 A | 6/1978 | Alexander | |
| 4,153,510 A | 5/1979 | Messing | |
| 4,229,442 A | 10/1980 | Pinckard | |
| 4,317,670 A | 3/1982 | Khoroshavin | |
| 4,331,652 A | 5/1982 | Ludwig | |
| 4,401,569 A | 8/1983 | Jhaveri | |
| 4,415,662 A | 11/1983 | Thirumalachar | |

(Continued)

FOREIGN PATENT DOCUMENTS
WO   WO2006133139   * 12/2006

*Primary Examiner* — Michael Marcheschi
*Assistant Examiner* — Shanta G Doe
(74) *Attorney, Agent, or Firm* — William Bodnar (57) ABSTRACT

This apparatus introduces catalysts and fluids into a media to effect remediation of contaminants, improve soil fertility and permeability, control undesirable pests, or create useful chemicals or food. The apparatus generates and releases enzymes, metabolites, and biologically active organisms. Aerobic metabolism of compounds in a media is facilitated through the transfer of fluids, such as air. The apparatus and methods provide an environment for select organisms, including refugia and nutrient substrate. The biodegradable composition of the apparatus is partially transformed by catalytic treatment. Catalysts or remediation agents are produced in-situ, for specific applications that provide a range of retention, activation, activity, and release profiles. The apparatus is placed in contact with media. Catalytic infusion of media by biological consortia, such as fungi, releases exudates that transform or biodegrade materials. As treatment proceeds, the chemical, physical and biological properties of the media are affected.

6 Claims, 7 Drawing Sheets

U.S. PATENT DOCUMENTS

| | | | |
|---|---|---|---|
| 4,416,993 A * | 11/1983 | McKeown | 435/243 |
| 4,452,894 A | 6/1984 | Olsen | |
| 4,456,685 A | 6/1984 | Guthrie | |
| 4,477,570 A | 10/1984 | Colaruotolo | |
| 4,494,975 A | 1/1985 | De Boodt | |
| 4,642,131 A | 2/1987 | Hoitink | |
| 4,713,343 A | 12/1987 | Wilson, Jr. | |
| 4,765,902 A | 8/1988 | Ely | |
| 4,803,800 A | 2/1989 | Romaine | |
| 4,810,385 A * | 3/1989 | Hater et al. | 210/606 |
| 4,818,530 A | 4/1989 | Marois | |
| 4,849,360 A | 7/1989 | Norris | |
| 4,850,745 A | 7/1989 | Hater | |
| 4,859,594 A | 8/1989 | Portier | |
| 4,882,059 A | 11/1989 | Wong | |
| 4,891,320 A | 1/1990 | Aust | |
| 4,959,154 A | 9/1990 | Simmons | |
| 5,068,105 A | 11/1991 | Lewis | |
| 5,100,455 A | 3/1992 | Pinckard | |
| 5,133,625 A | 7/1992 | Albergo | |
| 5,178,491 A | 1/1993 | Graves | |
| 5,207,389 A | 5/1993 | Hall | |
| 5,230,586 A | 7/1993 | Bachhausen | |
| 5,271,829 A | 12/1993 | Heppenstall | |
| 5,340,376 A | 8/1994 | Cunningham | |
| 5,360,607 A | 11/1994 | Eyal | |
| 5,459,065 A | 10/1995 | Aust | |
| 5,476,788 A | 12/1995 | Lamar | |
| 5,486,474 A | 1/1996 | Bradley | |
| 5,531,898 A | 7/1996 | Wickham | |
| 5,534,143 A | 7/1996 | Portier | |
| 5,679,364 A | 10/1997 | Levy | |
| 5,786,188 A | 7/1998 | Lamar | |
| 5,810,514 A | 9/1998 | Sucheki, Jr. | |
| 5,840,182 A * | 11/1998 | Lucido et al. | 210/202 |
| 5,858,384 A | 1/1999 | Levy | |
| 5,877,113 A | 3/1999 | Mehta | |
| 5,883,045 A | 3/1999 | Wada | |
| 5,925,252 A | 7/1999 | Cline | |
| 5,939,086 A | 8/1999 | Levy | |
| 5,983,558 A | 11/1999 | Las | |
| 6,066,772 A | 5/2000 | Hater | |
| 6,096,530 A | 8/2000 | Kato | |
| 6,171,853 B1 * | 1/2001 | Kim | 435/299.1 |
| 6,194,197 B1 | 2/2001 | Hyman | |
| 6,346,262 B1 | 2/2002 | Levy | |
| 6,395,534 B1 | 5/2002 | Raghukumar | |
| 6,402,887 B1 | 6/2002 | Akhtar | |
| 6,613,192 B1 | 9/2003 | Bajpai | |
| 6,660,290 B1 | 12/2003 | Stamets | |
| 6,664,102 B2 | 12/2003 | Illman | |
| 7,008,505 B2 | 3/2006 | Akhtar | |
| 7,122,176 B2 | 10/2006 | Stamets | |
| 7,300,583 B1 | 11/2007 | Heppenstall | |

* cited by examiner

APPARATUS AND METHOD FOR CATALYTIC TREATMENT OF A MEDIA

CROSS REFERENCE TO RELATED APPLICATIONS

This application claims priority to provisional application 61/010,990 filed on Jan. 14, 2008 and provisional application 61/144,439 filed on Jan. 13, 2009 and both applications are incorporated by reference herein.

FIELD OF THE INVENTION

The present invention relates to a dispensing apparatus and method for the generation and delivery over-time of remediation agents into a waste stream, wherein the apparatus is capable of maintaining the continuous delivery of a concentrated remediation composition throughout the delivery cycle. More particularly, the invention relates to a dispensing apparatus and method wherein the remediation agent is a bioremediation agent that contains living organisms.

BACKGROUND OF THE INVENTION

This invention relates generally to the bioremediation of contaminated soil, and ground water but may be applied to any application in which a media is intended to be transformed by the bioremediation processes and capabilities resulting from the growth and metabolism of Fungi and or Monera, and the liberation of their associated enzymes and chemical exudates. The invention is more particularly an apparatus and a method for the growing Fungi or Monera in situ where by the device is consumed by Fungi or Monera or a consortium of organisms, and produces enzymes that digest the target media such as crude oil in soil or contaminants in associated ground water.

Wood and Bamboo are particularly good materials for constructing the device as they are rigid, easily formed into hollow tubes that can be driven into contaminated soil and are easily inoculated with desirable species of Fungi or Monera that are capable of digesting a wide range of contaminants or target substrates.

Naturally-occurring and intentionally designed Fungi and Monera colonize and digest wood and other organic fibers. They accomplish this digestion and degradation process by exuding enzymes and colonizing the cell matrix, composed of cellulose, hemicellulose, lignin and other carbonaceous and protein compounds. These enzymes and chemical exudates are also capable of digesting almost any organic compound and rendering it into carbon dioxide, water, nitrogen gas and minerals.

These Fungi and Monera have been found to be effective in sequestering heavy metals from contaminated soil or water and in reducing certain metalloids to their elemental form. The art of mycoremediation and mycorestoration has been refined by a number of practitioners.

Mycoremediation is a form of bioremediation, the process of using mushrooms to return an environment (usually soil) contaminated by pollutants to a less contaminated state. The term mycoremediation was coined by Paul Stamets and refers specifically to the use of fungal mycelia in bioremediation. Mycelium is the vegetative part of a fungus, consisting of a mass of branching, thread-like hyphae. The mass of hyphae is sometimes called shiro, especially within the fairy ring fungi. Fungal colonies composed of mycelia are found in soil and on or in many other substrates. Mycelium may form fruiting bodies such as mushrooms. A mycelium may be minute, forming a colony that is too small to see, or it may be extensive.

It is through the mycelium that a fungus absorbs nutrients from its environment. It does this in a two stage process. Firstly the hyphae secrete enzymes onto the food source, which breaks down polymers into monomers. These monomers are then absorbed into the mycelium by facilitated diffusion and active transport. A hypha (plural hyphae) is a long, branching filamentous cell of a fungus, and also of unrelated Actinobacteria. In fungi, hyphae are the main mode of vegetative growth, and are collectively called a mycelium.

A hypha consists of one or more cells surrounded by a tubular cell wall. In most fungi, hyphae are divided into cells by internal cross-walls called septa (singular septum). Septa are usually perforated by pores large enough for ribosomes, mitochondria and sometimes nuclei to flow among cells. The structural polymer in fungal cell walls is typically chitin (in contrast plants have cellulosic cell walls, and animal cells lack walls). Some Fungi however, have non septate hypha, meaning their hypha are not separated by septa.

Hyphae grow at their tips. During tip growth, cell walls are extended by the external assembly and polymerization of cell wall components, and the internal production of new cell membrane. The Spitzenkorper is an intracellular organelle associated with tip growth. It is composed of an aggregation of membrane-bound vesicles containing cell wall components. The vesicles travel to the cell membrane via the cytoskeleton, and dump their contents outside the cell by the process of exocytosis. Vesicle membranes contribute to growth of the cell membrane while their contents form new cell wall. As a hypha extends, septa may be formed behind the growing tip to partition each hypha into individual cells. Hyphae can branch through bifurcation of a growing tip, or by the emergence of a new tip from an established hypha.

Hyphae may be modified in many different ways to serve specific functions. Some parasitic fungi form haustoria that function in absorption within the host cells. The arbuscules of mutualistic mycorrhizal fungi serve a similar function in nutrient exchange, so are important in assisting nutrient and water absorption by plants. Hyphae are found enveloping the gonidia in lichens, making up a large part of their structure. In nematode-trapping fungi, hyphae may be modified into trapping structures such as constricting rings and adhesive nets. Cords can be formed to transfer nutrients over larger distances.

Mycelium is vital in terrestrial and aquatic ecosystems for its role in the decomposition of plant material. It contributes to the organic fraction of soil and its growth releases carbon dioxide back into the atmosphere. The mycelium of mycorrhizal fungi increases the efficiency of water and nutrient absorption of most plants and confers resistance to some plant pathogens. Mycelium is an important food source for many soil invertebrates. Sclerotia are compact or hard masses of mycelium.

One of the primary roles of fungi in the ecosystem is decomposition, which is performed by the mycelium. The mycelium secretes extracellular enzymes and acids that break down lignin and cellulose, the two main building blocks of plant fiber. These are organic compounds composed of long chains of carbon and hydrogen, structurally similar to many organic pollutants. The key to mycoremediation is determining the right fungal species to target a specific pollutant. Certain strains have been reported to successfully degrade the nerve gases VX and sarin. Enzymes are proteins that catalyze (i.e. accelerate) chemical reactions. In enzymatic reactions, the molecules at the beginning of the process are called substrates, and the enzyme converts them into different molecules, the products. Almost all processes in a biological cell need enzymes in order to occur at significant rates. Since enzymes are extremely selective for their substrates and speed up only a few reactions from among many possibilities, the set of enzymes made in a cell determines which metabolic pathways occur in that cell.

Like all catalysts, enzymes work by lowering the activation energy ($E_a$ or $\Delta G^{\ddagger}$) for a reaction, thus dramatically accelerating the rate of the reaction. Most enzyme reaction rates are millions of times faster than those of comparable uncatalyzed reactions. As with all catalysts, enzymes are not consumed by the reactions they catalyze, nor do they alter the equilibrium of these reactions. However, enzymes do differ from most other catalysts by being much more specific. Enzymes are known to catalyze about 4,000 biochemical reactions. Although almost all enzymes are proteins, not all biochemical catalysts are enzymes, since some RNA molecules called ribozymes also catalyze reactions. Synthetic molecules called artificial enzymes also display enzyme-like catalysis.

Enzyme activity can be affected by other molecules. Inhibitors are molecules that decrease enzyme activity; activators are molecules that increase activity. Many drugs and poisons are enzyme inhibitors. Activity is also affected by temperature, chemical environment (e.g. pH), and the concentration of substrate. Some enzymes are used commercially, for example, in the synthesis of antibiotics. In addition, some household products use enzymes to speed up biochemical reactions (e.g., enzymes in biological washing powders break down protein or fat stains on clothes; enzymes in meat tenderizers break down proteins, making the meat easier to chew).

In an experiment conducted in conjunction with Battelle, a major contributor in the bioremediation industry, a plot of soil contaminated with diesel oil was inoculated with mycelia of oyster mushrooms; The Oyster mushroom, or *Pleurotus ostreatus*, is a common mushroom prized for its edibility. Long cultivated in Asia, it is now cultivated around the world for food. It is related to the similarly cultivated "king oyster mushroom". Oyster mushrooms can also be used industrially for mycoremediation purposes. Traditional bioremediation techniques (bacteria) were used on control plots. After four weeks, more than 95% of many of the PAH (polycyclic aromatic hydrocarbons) had been reduced to non-toxic components in the mycelial-inoculated plots. It appears that the natural microbial community participates with the fungi to break down contaminants, eventually into carbon dioxide and water. Wood-degrading fungi are particularly effective in breaking down aromatic pollutants (toxic components of petroleum), as well as chlorinated compounds (certain persistent pesticides; Battelle, 2000).

Saprophytic and parasitic fungi help create the organic components of topsoil, with the interdependent assistance of bacteria, insects, and other organisms. An array of primary, secondary, and tertiary saprophytic fungi convert wood and plant materials into biodynamic soil components. These soils benefit plants that in turn use photosynthesis to manufacture their own foods. They are capable of changing the pH and weathering the soil and parent rock underlying it.

Work performed by the Institute of Microbiology, Academy of Sciences of the Czech Republic, 142 20 Prague, Czechia. Identified a number of white-rot fungal cultures, strains of *Irpex lacteus* and *Pleurotus ostreatus* which were selected for degradation of 7 three- and four-ring unsubstituted aromatic hydrocarbons (PAH) in two contaminated industrial soils. Respective data for removal of PAH in the two industrial soils by *I. lacteus* were: fluorene (41 and 67%), phenanthrene (20 and 56%), anthracene (29 and 49%), fluoranthene (29 and 57%), pyrene (24 and 42%), chrysene (16 and 32%) and benzo[a]anthracene (13 and 20%). In the same two industrial soils *P. ostreatus* degraded the PAH with respective removal figures of fluorene (26 and 35%), phenanthrene (0 and 20%), anthracene (19 and 53%), fluoranthene (29 and 31%), pyrene (22 and 42%), chrysene (0 and 42%) and benzo[a]anthracene (0 and 13%). The degradation of PAH was determined against concentration of PAH in non-treated contaminated soils after 14 weeks of incubation. The fungal degradation of PAH in soil was studied simultaneously with ecotoxicity evaluation of fungal treated and non-treated contaminated soils. Compared to non-treated contaminated soil, fungus-treated soil samples indicated decrease in inhibition of bioluminescence in luminescent bacteria (*Vibrio fischerii*) and increase in germinated mustard (*Brassica alba*) seeds.

Mycofiltration is a similar or same process, using fungal mycelia to filter toxic waste and microorganisms from water in soil.

SUMMARY OF THE INVENTION

Embodiments of the present invention provide an apparatus and method for introducing and dispensing biological organisms and their chemical metabolites along with aerobic conditions into a contaminated soil, or associated ground water, and or other biodegradable media in order to; effect the remediation of contaminants, and or improve soil fertility and or improve soil permeability, and or control undesirable pests, and or create useful chemicals, or foods. The apparatus is capable of generating and maintaining a release of enzymes, metabolites, and biologically active organisms including members of one or more of the kingdoms: Fungi, Protista, Plantae, and Monera, in order to accomplish the metabolism of organic compounds in the selected substrate, throughout the delivery cycle. The invention also provides a dispensing apparatus and methods wherein, the dispensing device becomes the inoculum, or is partially transformed or replaced by selected organisms, acting as a nutrient substrate or refugia for the selected organisms.

Finally, embodiments of the invention provide a dispensing apparatus and methods wherein compositions of useful Fungi, Monera, Protozoa, or Plantae and their associated enzymes, chemicals and or remediation agents are produced in-situ, for specific applications providing a range of retention, activation, activity, and release profiles. The remediation step includes: A. Placing the inoculated device in contact with the target media or contaminated substrate under conditions suitable to support its continued growth. B. The invasion of the target substrate or contaminant by the selected fungi or biological consortium. C. The release of associated metabolic and enzymatic chemical exudates, and digestive acids, under conditions suitable for the consortium to mediate the transformation or biodegradation of the target contaminant or selected target substrate. D. The consumption of the target media or contaminant. E. The transformation of the chemical and physical properties of the media.

This invention is directed to a Method for bio remediation and myco-remediation. These and other features and advantages of the invention will become more clearly understood upon consideration of the following detailed description and accompanying figures.

BRIEF DESCRIPTION OF DRAWINGS

The character of the invention, however, may be best understood by reference to one of its structural forms, as illustrated by the accompanying drawings, in which.

DETAILED DESCRIPTION OF THE PREFERRED EMBODIMENTS

Figure 1:
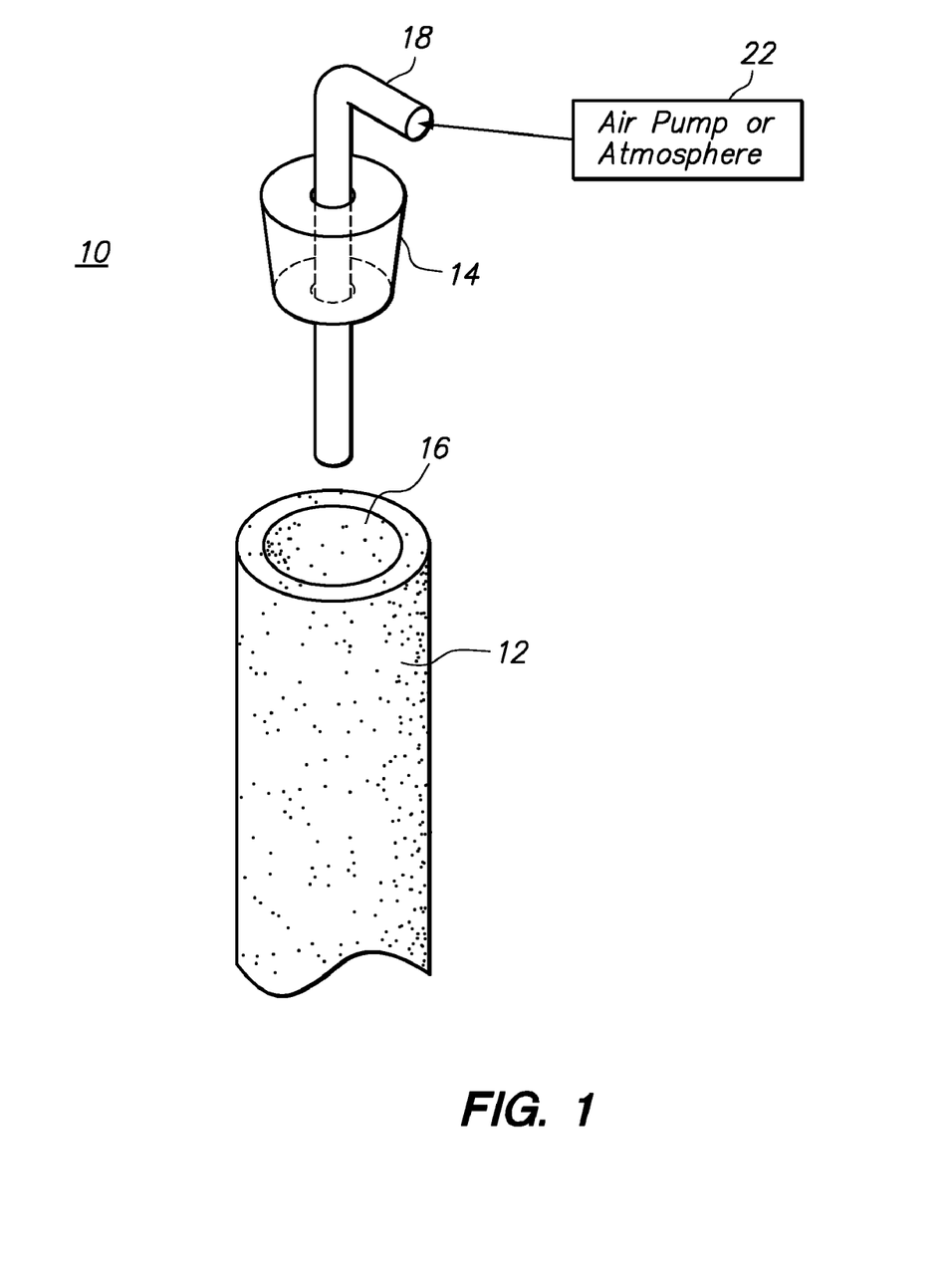
FIG. 1 shows an embodiment of the invention connected to an external fluid supply.

Referring to FIG. 1, which shows the general features of a preferred embodiment of the invention, the apparatus 10 is comprised of a vessel (or vessel body) 12 and a cap 14 with an opening. The vessel has a cavity 16 that extends through the majority of the length of the vessel. A fluid transfer device 18 is fitted through an opening in the cap and into the vessel (only a portion of the fluid transfer device or tube is shown for clarity). The fluid transfer device 18 can be connected to an external fluid supply 22 as illustrated.

In some instances the fluid transfer device can provide a connection to the environment without the aid of a mechanical fluid supply device. Therefore graphic 22 can represent the local environment or an external fluid supply device that is mechanical. In other words, the external fluid can be provided by mechanical or non-mechanical (passive) means. The illustrations may not all show the external fluid source but all embodiments with a fluid transfer device 18 contemplate an external fluid source as an option.

Figure 2:
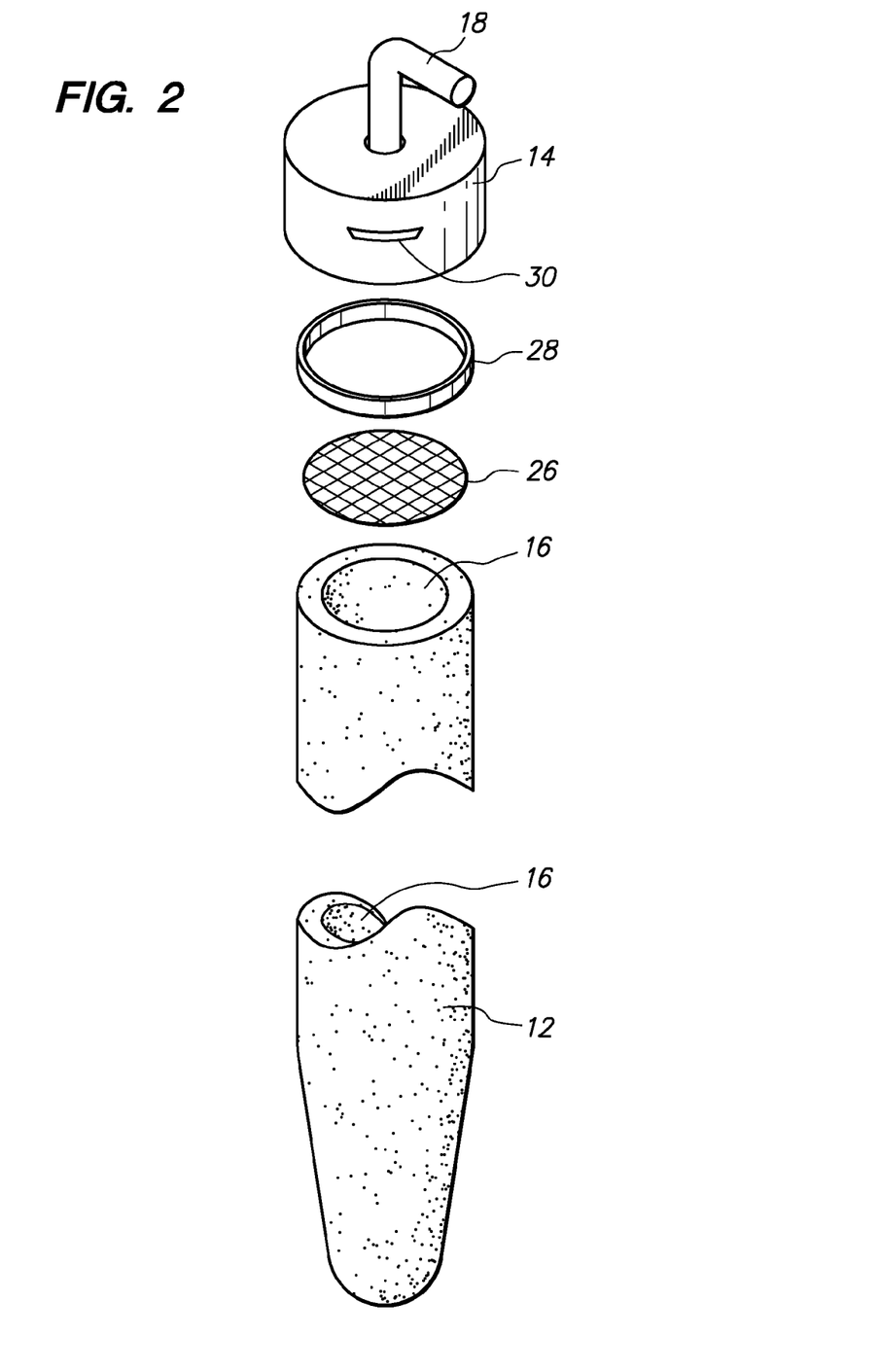
FIG. 2 illustrates an apparatus with a filtering device, spacer and vented cap.

FIG. 2 shows another embodiment of the apparatus with a filter screen 26 and spacer 28 between the vessel 12 and cap 14. The fluid transfer device 18 is shortened for clarity. The cap 14 in FIG. 2 illustrates an additional opening 30 that can be utilized to vent fluids from the vessel. Additional openings are not necessarily shown on the other drawings but several embodiments contemplate additional openings in either the cap or the vessel body or both.

Figure 3:
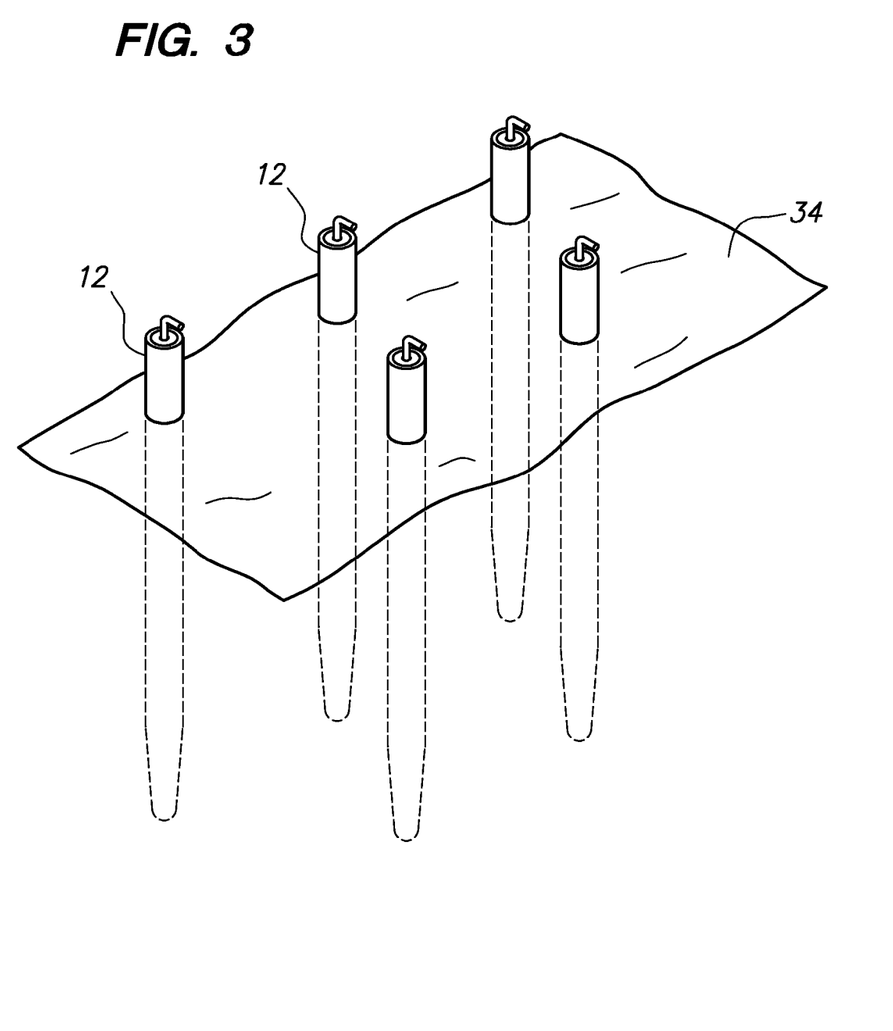
FIG. 3 depicts how multiple vessels can be arranged in a grid like array pattern.

FIG. 3 illustrates a number of apparatus used in a grid-like pattern. In some instances a covering 34 may be utilized. The covering is not shown in additional drawings for brevity but all embodiments utilizing a plurality of apparatus may utilize a covering of some type.

Figure 4:
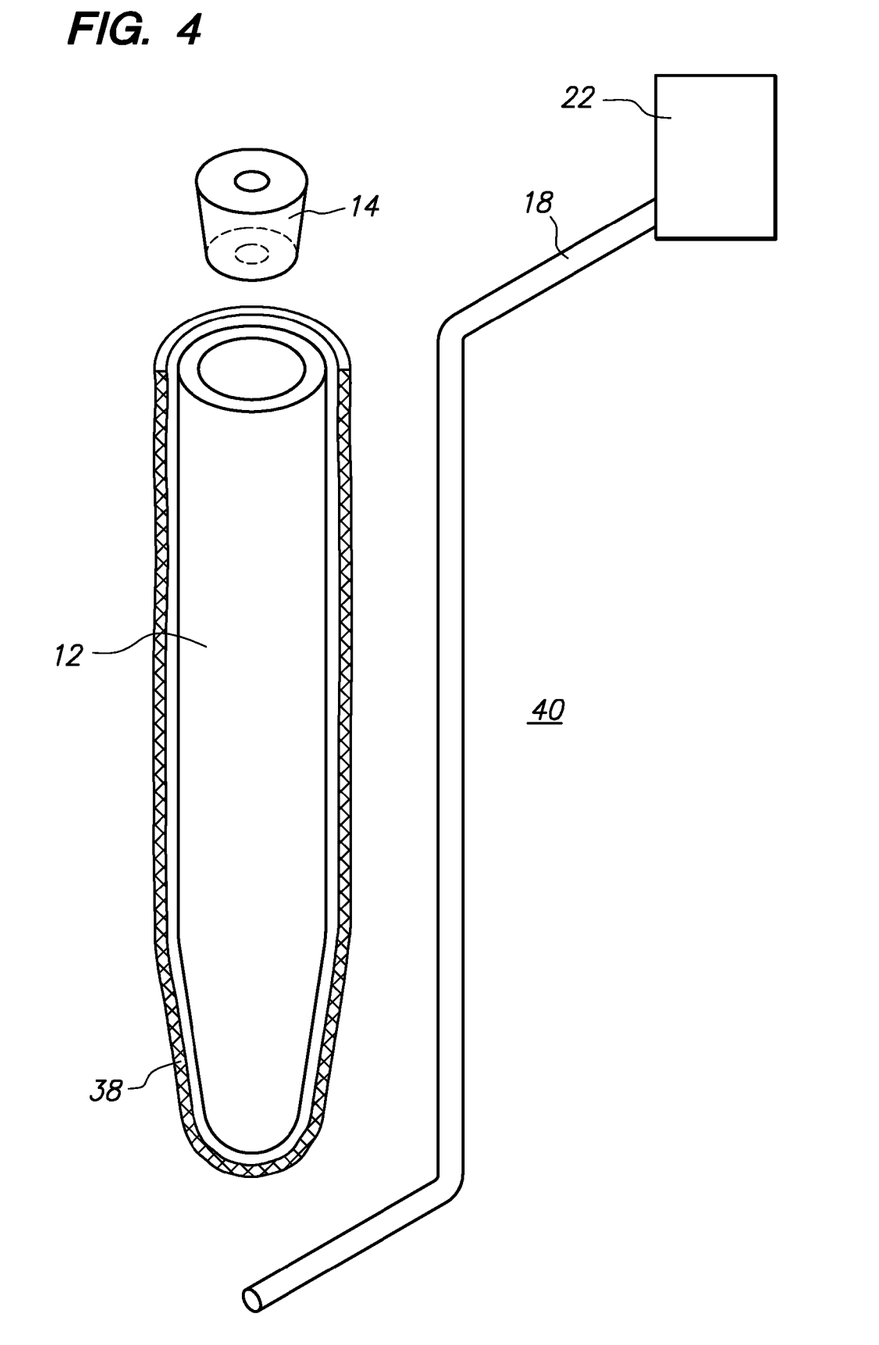
FIGS. 4 through 10 show embodiments of the apparatus with external fluid supplies capable of delivering fluids into or outside of the vessel. These figures and the following detailed description disclose specific embodiments of the invention, however, it is to be understood that the inventive concept is not limited thereto since it may be embodied in other forms.

FIG. 4 shows the apparatus comprised of a vessel 12, cap 14 and wrap 38. In this embodiment, the apparatus an external fluid supply 22 is utilized to provide fluid to the media 40 around the apparatus.

Figure 5:
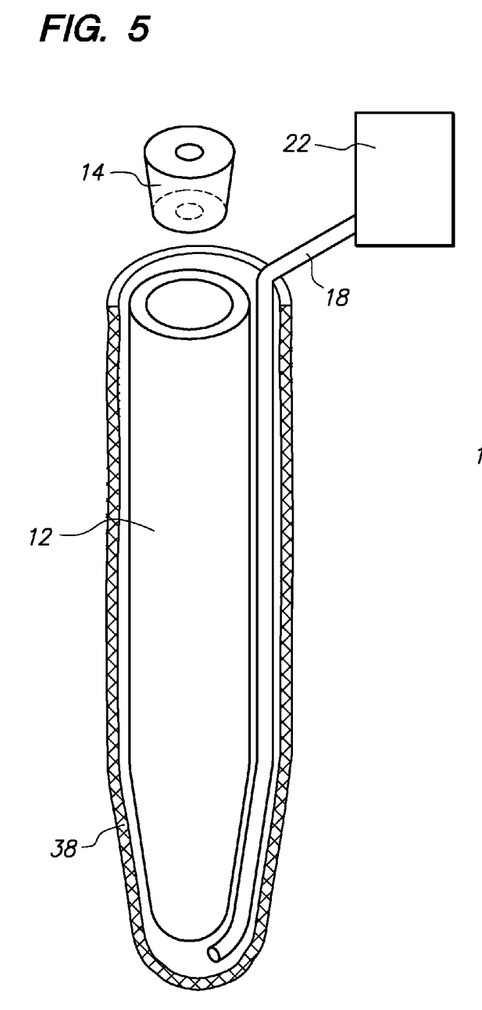

FIG. 5 shows an embodiment wherein the external fluid supply 22 can provide fluid to the area between the vessel 12 and the wrap 38.

Figure 6:
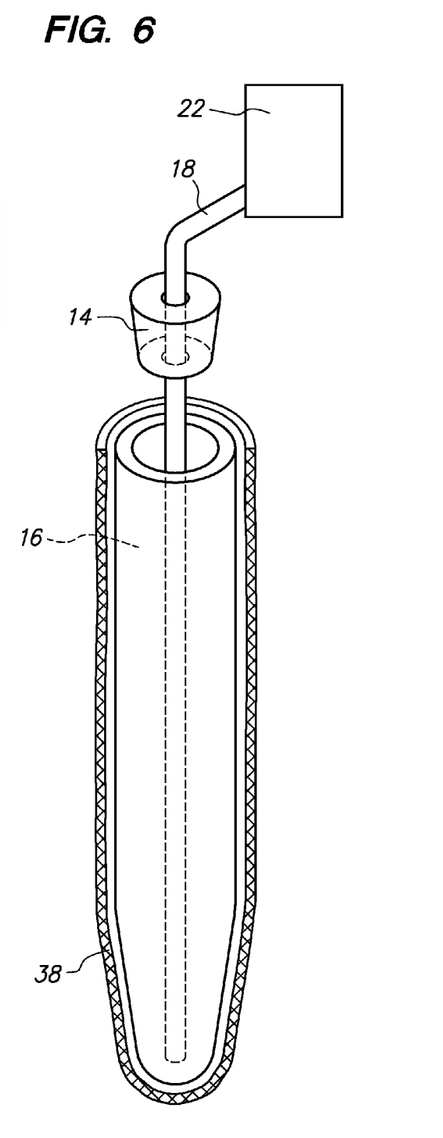

FIG. 6 illustrates an embodiment wherein the external fluid supply 22 can provide fluid to the vessel cavity 16 through the cap 14.

Figure 7:
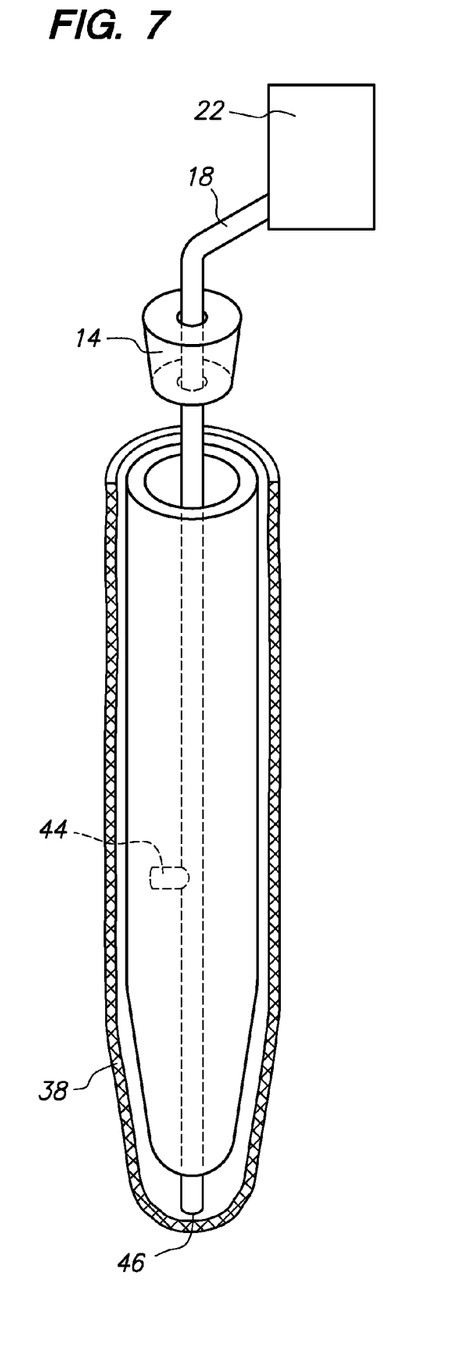

FIG. 7 shows an embodiment wherein the external fluid supply 22 can provide fluid to the vessel cavity (see position 44) as well as to the area 46 between the vessel and the wrap 38 (see reference 46 for approximate position).

Figure 8:
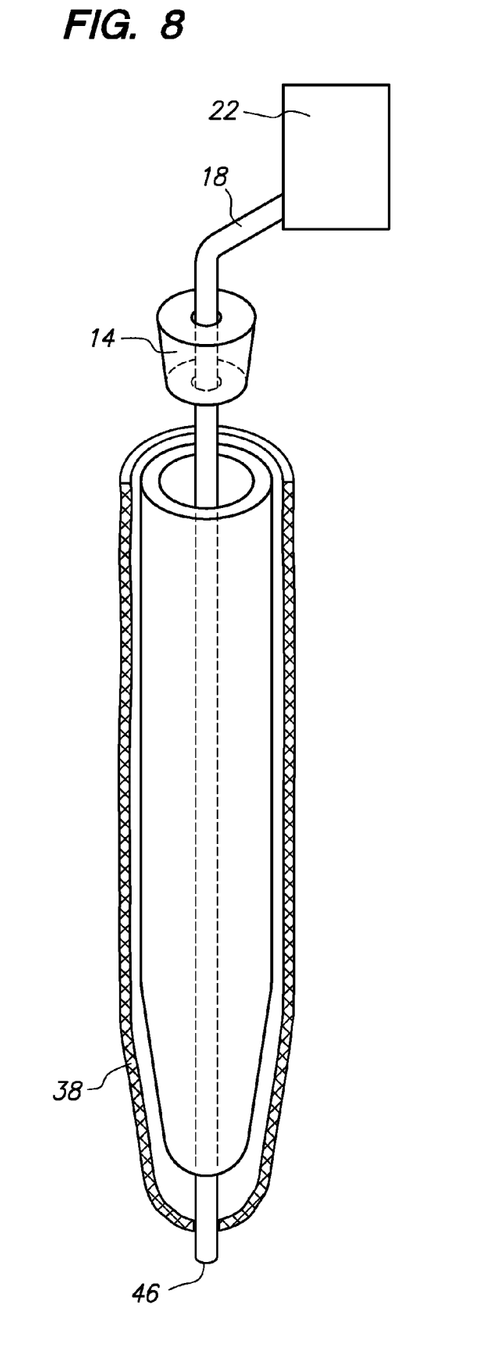

FIG. 8 shows an embodiment wherein the external fluid supply 22 can provide fluid to the vessel cavity (see position 44) as well as to and/or through the wrap 38 into the media.

Figure 9:
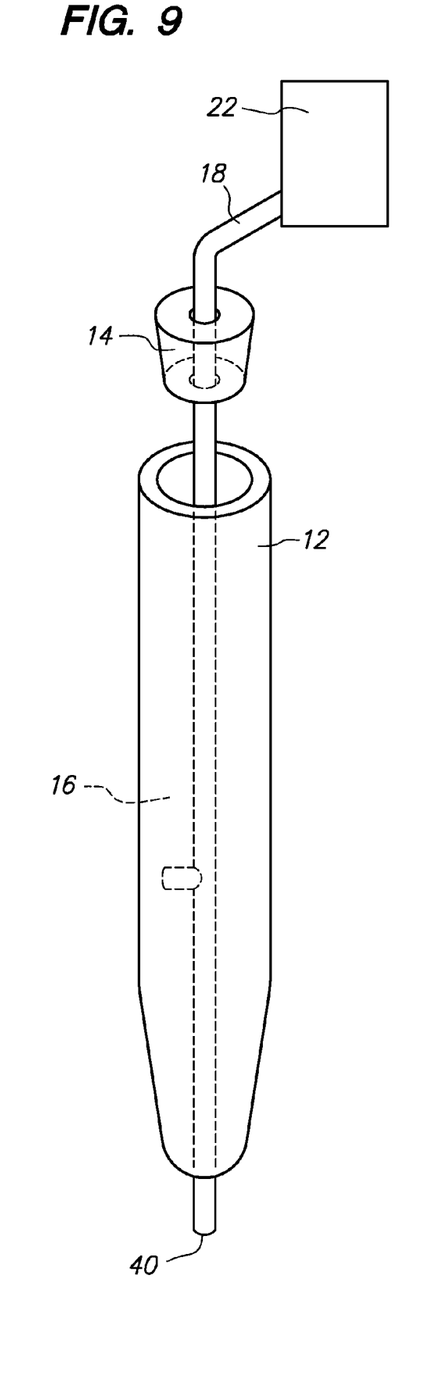

FIG. 9 shows an embodiment wherein the fluid transfer device 18 can provide a fluid pathway to the vessel cavity 16 as well as to the media 40.

Figure 10:
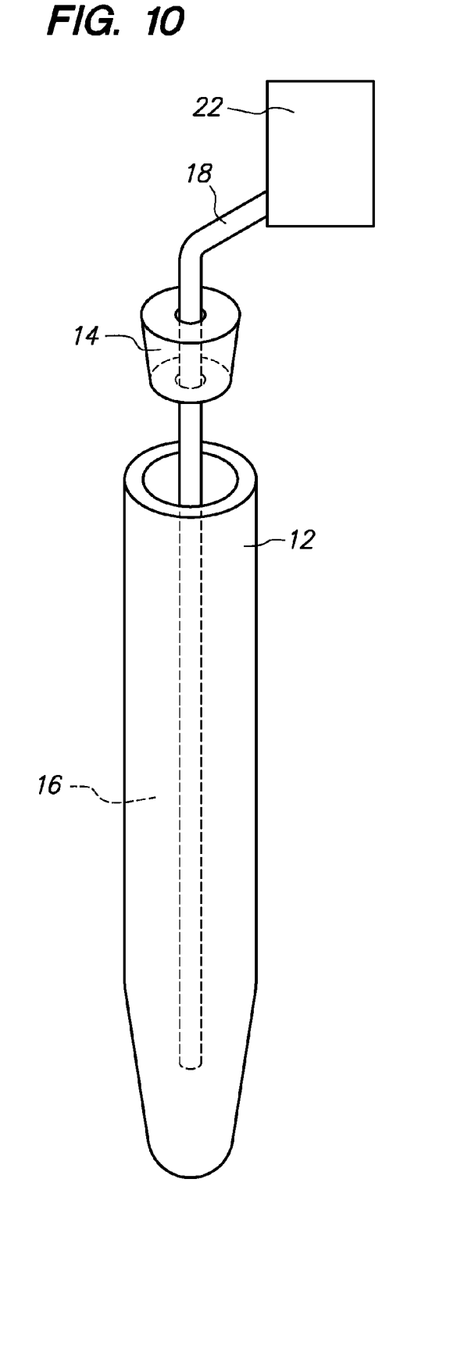

FIG. 10 shows an embodiment wherein the fluid transfer device 18 provides a fluid pathway to the cavity 16. This embodiment does not utilize a wrap.

Detailed Description of Illustrative Embodiments for Remediation Application This method involves use of the described apparatus for remediation of a media. This applies to any media that can benefit from remediate as described herein. In remediation applications, at least one, but preferably a number of vessels of a length sufficient to reach the target media (e.g. the bottom of contaminated soil) should be utilized.

This method could be used, for example, for remediation of a soil medium that is contaminated and or saturated with crude oil overlying ground water. Remediation would be performed after an analysis of the baseline levels of contaminants and their depth.

The vessel(s) should be inoculated with *Pleurotus* or other fungi capable of digesting the contaminant. If more than one vessel is utilized, the vessels should be inserted in a grid like pattern in the targeted soil area leaving a portion of the vessel (s) sticking above the ground.

The vessel(s) can be covered with a vessel cap either before or after inserting the vessel(s) into the target media. In one embodiment of utilizing the apparatus to effect remediation, bunker spawn filled burlap sacks are placed in direct contact with or in the immediate vicinity of the above ground portion of the vessels to directly or indirectly "connect" the adjacent vessels with one another.

Moisture can be provided if the media (soil) is not sufficiently moist to support the growth of fungi. Straw covering or other suitable shading materials can be used if drying conditions prevail.

The progress of mycelium growth and the deterioration of the vessel(s) can be monitored periodically. The media can be sampled periodically to chart the progress of remediation as enzymes digest the contaminant(s) and mycelium colonize the media.

The vessel(s) can be replaced as needed by driving new vessels into the media adjacent to or into the center of the original vessels thus bursting them and further intruding mycelium inoculated wood into the media surrounding the vessels. The bunker spawn sacks can be replaced as needed and the media recovered with straw or shade materials.

This process could be continued periodically until the media or soil has been mycoremediated. The process could be continued by inoculating the vessels with Monera such as Pseudomonas and Bacillus or other bacteria known to consume petroleum and digest the mycelium strands that have invaded the media or soil.

At the conclusion the soil will have been cleansed of crude oil which will have been converted into carbon dioxide, water and minerals, and some carbon residuals with improved soil properties. The enzymes secreted by the Fungi and or Monera will have begun the process of remediation of the ground water and stopped the ongoing contamination of the affected ground water.

Detailed Description of Illustrative Embodiments for Application to Control a Pest Such as Protozoa, or Nematode This method involves use of the described apparatus to control a pest such as, but not limited to, protozoa or nematode. For example, an area inhabited by insects that that harbor malaria or a soil infested with a destructive nematode can benefit from such application. For control of pests, at least one, but preferably a number of vessels of a length sufficient to reach the desired soil depth should be utilized.

The vessel(s) should be inoculated with a Fungi or Monera that produces compounds that are toxic to the targeted pest species and that use the vessel(s) as a platform for invading the surrounding media (soil). If more than one vessel is utilized, the vessels should be inserted in a grid like pattern in the targeted soil area leaving a portion of the vessel(s) sticking above the ground.

The Fungi or Monera that has been specifically selected to inoculate the stake will later leach compounds that are toxic to the target insect or protozoan.

Detailed Description of Illustrative Embodiments for Application to Improve Percolation of Soil This method involves use of the described apparatus to improve the percolation of a media, most commonly soil, for example. This applies to any area that can benefit from improved soil permeability to water or improved percolation among other benefits. In this case, at least one, but preferably a number of vessels of a length sufficient to reach the desired soil depth should be utilized.

The vessel(s) should be inoculated with fungi capable of producing mycelium that that use the vessel(s) as a platform for invading the surrounding media (soil). If more than one vessel is utilized, the vessels should be inserted in a grid like pattern in the targeted soil area leaving a portion of the vessel (s) sticking above the ground.

The vessel(s) can be covered with a vessel cap either before or after inserting the vessel(s) into the target media. In one embodiment of utilizing the apparatus to improve soil permeability, bunker spawn filled burlap sacks are placed in direct contact with or in the immediate vicinity of the above ground portion of the vessel(s) to directly or indirectly "connect" the adjacent vessels with one another. Several types of media covering are contemplated and the covering is not limited to burlap sacks.

Moisture can be provided if the media (soil) is not sufficiently moist to support the growth of fungi. Straw covering or other suitable shading materials can be used if drying conditions prevail. This method can be utilized in association with the planting of trees and the selected Fungi can be mycorrhizal with such trees or in order to prepare the soil in such a way as to improve the growth of such trees or other plants.

CONCLUSIONS, OTHER EMBODIMENTS, AND SCOPE OF INVENTION

There are several embodiments of apparatus that are contemplated for uses disclosed herein. A summary of the variations or embodiments are shown in the following table.

TABLE 1

| | Vessel | Cap | Wrap | External Fluid Supply |
|---|---|---|---|---|
| 1 | At least one opening | At least one opening | None | None |
| 2 | At least one opening | At least one opening | Yes | None |
| 3 | At least one opening | At least one opening | None | Yes |
| 4 | At least one opening | At least one opening | Yes | Yes |

It is anticipated that the vessel, wrap or both can be inoculated. The vessel body and or the wrap could be comprised of netting or woven material in other embodiments.

It is also anticipated to have a vented cap plus an external air supply. In such a configuration we would install an air tube inside of the cavity down to the bottom. That tube would deliver the air at the bottom inside of the apparatus and the vents at the top would displace gas such as carbon dioxide. The inner tube is an extension of the cap tubulation which can be of any length.

Covering can be utilized to provide a type of connection between multiple apparatus. All embodiments contemplate the option of having covering applied before or after the apparatus in set into the media.

Many methods of treatment are contemplated within the scope of this application as indicated below.

A Method of treatment of a media utilizing one or more variations of the apparatus disclosed herein, comprising at least two of the following steps of:

(a) inoculating a vessel, or a wrap around the vessel, or both, (b) introducing the vessel alone, or the vessel and the wrap into the media, and (c) introducing fluid into one or more of the:

1) the vessel, 2) the area between the vessel and the wrap, 3) the wrap, or 4) the media in the immediate vicinity of the vessel or wrap, for at least one of the following purposes; effect the remediation of contaminants in the media, improve media fertility, improve media permeability, control undesirable pests, or create useful chemicals or foods.

The method of treatment wherein the bioremediation step is achieved as specific fungal mycelium or specific bacterial colonies grow through and then beyond the refugia of the vessel and invade the surrounding contaminated soil, their growth and metabolism resulting in the production and exudation of digestive enzymes, metabolites, acids and reactive compounds that perfuse the contaminant medium and transform the contaminant medium thus resulting in its transformation.

The method of treatment wherein the media is a contaminated soil, contaminated water, pulp, manure, food, solid waste, sludge, crude oil, asphalt, industrial waste, pesticide residue, herbicide residue, coal residue, or explosive residue.

The method of treatment wherein the organism responsible for achieving the transformation of the target media or the bioremediation of the contaminated soil is at least one member of the following kingdom group: Fungi, Monera, Protista.

The method of treatment wherein one component of treatment is accomplished by a consortium of organisms arising from the Kingdoms; Fungi, and or Monera and or Protista and or Plant.

The method of treatment wherein the delivery device is comprised of wood, bamboo, coconut husk, biodegradable plastic, or composite plant fiber which has been inoculated and colonized by mycelium or other selected organism, prior to being introduced to the media.

The method of treatment wherein the wood, bamboo, coconut husk, biodegradable plastic, or composite plant fiber comprising the delivery device is consumed by the inoculated Fungal mycelium while colonizing and co-metabolizing the media.

The method of treatment wherein the wood, bamboo, coconut husk, biodegradable plastic, or composite plant fiber comprising the delivery device is consumed by the Fungal mycelium within it and exudes or delivers enzymes, metabolic products and chemical compounds to the surrounding environment that transform the chemical or physical properties of the media.

The method of treatment wherein the wood, bamboo, coconut husk, biodegradable plastic, or composite plant fiber comprising the delivery device is consumed by the bacterial culture within it and exudes or delivers enzymes, metabolic products and chemical compounds to the surrounding environment that transform the chemical or physical properties of the media.

The method of treatment wherein aerobic conditions are maintained within components of the delivery device by passive internal ventilation to the atmosphere provided by a combination of open internal architecture, ventilation ports, vented caps or air porous membranes.

The method of treatment wherein aerobic conditions are maintained within the device as a result of forced air ventilation derived from mechanical or electrical devices.

The method of treatment wherein the aerobic conditions are maintained within the device by chemical or biological reactions or the release of oxygen from a chemical or biological process.

The method of treatment wherein aerobic conditions are maintained within components of the device as a means of supporting the growth of fungi and or other aerobic organisms.

The method of treatment wherein the device itself acts as a refuge for growth, and a food source for that organism to sustain the degradation of a contaminant or target media.

The method of treatment wherein the tapered end of the delivery device is driven or inserted into the target media at any angle.

The method of treatment wherein the media being treated is at least one of the following: soil, contaminated water, an aqueous fluid or a slurry, a liquid or semi-liquid viscous material such as crude oil, sludge, manure, pulp or garbage.

The method of treatment wherein the target media is being improved, changed or modified to produce a useful food, fiber, or other consumable product fit for animal or human consumption.

The method of treatment wherein the target media is being improved, changed or modified by the release or production of a virocide, vermicide, insecticide, herbicide, antimicrobial, or agent for the control of a protozoan, insect, or disease causing organism.

The method of treatment wherein the soil or media is improved in fertility, nutrient availability, friability, percolation, pH, microbial diversity, or health by the release or production of an enzyme, cytokine, protein, drug compound, metabolite, or carbohydrate.

The method of treatment wherein the soil or media is improved in fertility, nutrient availability, friability, percolation, pH, or health by the stimulation of beneficial soil organisms including: nematodes, annelids, insects, microbes and fungi.

The method of treatment wherein the media being treated is a particulate material, a surface soil, a subsurface soil, a sand, a silt, a clay, a sediment, a loam, a slurry, a colloid, a liquor, an industrial water fluid, a ground water, a fluid contained within a pool, a tank, a vessel, a pond, a lake, or open body of water.

The method of treatment wherein the media is at least one particulate material from the group: gravel, pebbles, stone, chips, rock, ore, mining waste, coal, coke, slag, concrete, brick, construction material, demolition material, vermiculite, synthetic resin, composite material, drilling mud, or plastic.

The method of treatment wherein the contaminating organic compound is selected from the group consisting of a polycyclic compound, an aromatic compound, a polycyclic aromatic compound, an aliphatic compound, an olefinic compound and or an ethynic compound.

The method of treatment wherein the media or contaminant is crude oil, tar, asphalt, wax, a refined petroleum product or distillate derived from a petroleum product, or a synthetic derivative of a petroleum product, a benzene, toluene, ethylbenzene, xylene, stytene, vinyl, naphthalene, anthracene, phenanthrene, pyrene, coronene, azulene, alcohol, ketone, or aldehyde, fluorene, pyrene, chrysene and benzo(a)pyrene.

The method of treatment wherein the contaminant is a radionuclide.

The method of treatment wherein the media contains a contains an ore, substrate or contaminant that is a metal including but not limited to iron, vanadium, lead, mercury, selenium, strontium, manganese, iron, cobalt, silver, gold, noble metal, nickel, copper or zinc.

The method of treatment wherein the ore, substrate or contaminant is bio-accumulated by fungi for the purpose of expediting its removal from the substrate.

The method of treatment wherein the contaminant is a phthalate, perchlorate, a perbromate, a periodate, a nitrate, a sulfate, a sulfide, a hydroxylated benzene, a hydroxylated benzoic acid, a nitrilotriacetic acid, a diethylenetriaminepentaacetic acid.

The method of treatment wherein the contaminant is polymer chain. The method of treatment wherein the contaminant is an oxygenate such as methyl tributyl ether (MTBE).

The method of treatment wherein the contaminant is a chemical warfare agent such as Sarin gas, VX, Soman, or related organophosphate pesticide. The method of treatment wherein the contaminant is a herbicide such as 2-4-5T, 2-4-D, Glosophate or other plant poison.

The method of treatment wherein the molecular weight of the organic compound of the contaminate is reduced. The method of treatment wherein the organic compound of the contaminate is substantially mineralized to carbon dioxide and water.

The method of treatment wherein the contaminated soil or media is toxic or carcinogenic to animals. The method of treatment wherein the organic compound of the contaminated soil or media is toxic or carcinogenic to humans. The method of treatment wherein the reaction products formed are non-toxic to animals. The method of treatment wherein the reaction products formed are non-toxic to humans.

The method of treatment wherein treating with the microbial consortium yields at least one product of biodegradation, and wherein the products of biodegradation are non-toxic to animals. The method of treatment wherein the products of biodegradation are non-toxic to humans. The method of treatment wherein the biodegradation products are not known to be carcinogenic in animals. The method of treatment wherein the biodegradation products are not known to be carcinogenic in humans.

The method of treatment wherein the reaction products formed are toxic to specific Monera including virus and bacteria. The method of treatment wherein the reaction products formed are toxic to specific invertebrate pests including crustaceans, mollusks, insects, and worms. The method of treatment wherein the reaction products formed are toxic to specific plant pests.

The method of treatment wherein the reaction products formed are toxic to specific virus or bacteria. The method of treatment wherein the reaction products formed) are toxic to specific protozoan organisms.

The method of treatment wherein the organic compound of the contaminate is derived from industrial manufacturing, industrial processing, chemical processing, coal tar processing, oil refining or energy generation. The method of treatment wherein the organic compound of the contaminate is from a natural process. The method of treatment wherein the organic compound of the contaminate is halogenated compound.

The method of treatment wherein the contaminate is a halogenated organic compound selected from the group consisting of a trichlorethene compound, a perchlorethene compound or a polychlorinated-biphenyl compound. The method of treatment wherein the contaminant is a dioxin.

The method of treatment wherein the microbial consortium comprises at least one of the following: a bacteria, a fungi, or an *actinomyces*. The method of treatment wherein the microbial consortium is known to degrade the organic compound of the contaminant.

The method of treatment wherein the microbial consortium comprises at least one of the following: an *Alcaligenes* species, a *Sphingomonas* species, a *Pseudomonas* species, a *Bacillus* species, a *Rhodotorula* species, a *Burkholderia* species, an *Ochrobactrum* species, a *Rhodococcus* species, a *Xanthomonas* species and an *Actinomyces*, or *Basidiomycetes*, species.

The method of treatment wherein the microbial consortium comprises on of the following families of fungi: Russulaceae, Hygrophoraceae, Trichlolmataceae, Rhodophyllaceae, Volvariaceae, Amanitaceae, Lepitaceae, Agaricaceae, Strophariaceae, Coprinaceae, Bolbitiaceae, Cortinariaceae, Paxillaceae, Gomphidiaceae, Boletaceae, Polyporeacea and Braket fungi, Hydnaceae, Clacariaceae, Cantharellaceae, Gastromycetes lycoperdales, Phallales, Nidulariales, Hymenogastrales, Heerobasidiomyces, Discomycetes, Pezozaceae, Helvellaceae, Geoglossaceae, Tuberales, Pyrenomyces, and marine fungi now under investigation of indeterminate classification.

The method of treatment wherein the fungi being utilized as the inoculum is one of the following: *Antrodia radiculosa, Armillaria ostoyae, Bjerlamdera adista, Gloeophyllum trabeum, Grifola fondosa, Irpex lacteus, Lentinula edodes, Meruliporia incrassate, Mycena alcalina, Neamatoloma frowardii, Hypholoma, Phanerochaete chrysosporium, Pleurotus ostreatus, Pleurotus pulmonarius, Psilocybe* spp., *Serpula lacrymans, Trametes hirsute, Trametes versicolor*, including any change in naming any of these taxonomic classifications that may occur due to taxonomic adjustments in the future.

The method of treatment wherein the specific fungi, is cultured from indigenous fungi found in the location of the contamination and inoculated into the delivery device specifically for its ability to survive in or consume the target contaminant.

The method of treatment wherein multiple apparatus as disclosed herein are inoculated with biologically active organisms and introduced into a contaminated soil or other media to achieve bioremediation of the contaminated soil or transformation of the media.

The method of treatment wherein each apparatus is located within a grid pattern such that it is spaced somewhat equidistant from the adjacent apparatus within the grid. The method of treatment wherein one apparatus is set apart from other apparatus by a prescribed distance. The method of treatment wherein the offset distance between devices is adjusted so as to be the distance that the mycelium of the specifically selected strain of fungi is able to bridge, and form an intersecting cross linkage with the mycelium from another similarly inoculated device that is located within the grid.

The method of treatment wherein the distance between the placement of apparatus is set at the distance that a selected strain of fungi is able to leap-off of one apparatus and colonize a substrate composed of similar materials that have not been inoculated.

The method of treatment wherein separate apparatus within the treatment zone or media are inoculated with different strains of fungi, or combinations of fungi and bacteria.

The method of treatment wherein a previously placed vessel of the apparatus is replaced by driving or inserting a second vessel into the hollow central core thus causing the original vessel to burst and be forced into the surrounding media or contaminated soil. The method of treatment wherein the replacement vessel is intended to restore aerobic conditions to a specific application point within a contamination site or media.

The method of treatment wherein the replacement vessel is intended to replenish the substrate with a fresh supply of the selected organism for the continued colonization of the target media or contaminated soil. The method of treatment wherein the replacement vessel is intended to re-introduce the same culture of microorganism into the media or contaminated soil. The method of treatment wherein the replacement vessel is intended to introduce a different strain of biological organism into the medium or contaminated soil to replace the existing strain.

The method of treatment wherein the replacement vessel is intended to introduce a different second strain or multiple strains of biological organism(s) into the medium or contaminated soil to assist the first strain with mutual synergistic, or sequential co-metabolism of the substrate or contaminant.

The method of treatment wherein the replacement vessel is intended to expand the circumference of the inoculation site by bursting and driving fragments of the first or previous device further into the surrounding media or contaminated soil.

The method of treatment wherein the apparatus improves the health, growth, or yield of trees, and other vascular plants. The method of treatment wherein the apparatus prevents or treats a plant related disease.

The method of treatment wherein the apparatus is placed into a hole that has been excavated by auger or other earth or media moving device.

The method of treatment wherein the ventilation cap that utilized with the vessel is an inverted container of plastic or other suitable material, that sheds water keeping the hollow interior dry while allowing air to enter to maintain humid aerobic conditions conducive for the growth of mycelium or bacteria.

The method of treatment wherein bunker spawn contained in fiber or fabric wrap is brought into direct contact with the apparatus facilitating mycelial bridging between device and bunker spawn.

The method of treatment wherein the device is covered with a mulch consisting of a carbon yielding source such as straw, saw dust cardboard, manure, or organic waste.

The method of treatment wherein the specific organism is a Monera that is cultured from indigenous Monera found in the location of the contamination and inoculated into the apparatus specifically for its ability to survive in or consume the target contaminant.

GLOSSARY

The Applicants intend to act as their own lexicographers in the Present Application. The definitions of terms appearing below supersedes the plain and ordinary meanings of those terms:

Permeability: Commonly symbolized as K or k, permeability is a measure of the ability of a material to transmit fluids. It is typically measured by application of Darcy's law.

Essentially Impermeable: A material which possesses the property of decreasing the rate of flow of a fluid that is a liquid through said material. Materials possessing this level of essential impermeability are rated at approximately 10,000 millidarcy or less. A millidarcy is a unit of permeability that describes the flow of a fluid through a media.

Semi-Permeable: Measure of the ability of a material to transmit fluids that are gases, slowing the velocity of the gas and allowing for the subsequent retention and passage of said gasses; including materials such as wood, sintered materials, polymers or plastics with a permeability rating of approximately $1.2$ mm $cm^3/cm^2$ sec $(cmHg) \times 10^{10}$ or greater.

Darcy's law: A phenomologically derived constitutive equation that describes the flow of a fluid through a porous medium.

Fluid: A gas or liquid.

Hydrocarbon: A hydrocarbon is any compound composed of carbon and hydrogen atoms with or without oxygen and with or without the substitution of other elements such as wood, wherein those hydrocarbon compounds are primarily cellulose, hemi-cellulose, lignin and various polymerized sugar molecules.

Biodegradation: The complete or partial breakdown of organic compounds by living organisms into smaller compounds where the organisms transform the compounds through metabolic or enzymatic processes. Biodegradation processes vary greatly, but frequently the final product of the degradation is carbon dioxide or methane.

Gas: Any biologically active gas including; oxygen, carbon dioxide, methane, nitrogen, hydrogen sulfide, water vapor, or any gas that is a pollutant capable of being metabolized.

Enzyme: An enzyme includes any of the chemicals that have been classed as being enzymes and referenced by EC number as defined by the Nomenclature Committee of the International Union of Biochemistry and Molecular Biology (NC-IUBMB) in consultation with the IUCPAC-IUBMB Joint Commission on Biochemical Nomenclature (JCBN); and or any chemical compound that is published in Enzyme Nomenclature 1992 [Academic Press, San Diego, Calif., ISBN 0-12-227164-5 (hardback), 0-12-227165-3 (paperback)] with *Supplement* 1 (1993), *Supplement* 2 (1994), *Supplement* 3 (1995), *Supplement* 4 (1997) and *Supplement* 5 (in *Eur. J. Biochem.* 1994, 223, 1-5; *Eur. J. Biochem.* 1995, 232, 1-6; *Eur. J. Biochem.* 1996, 237, 1-5; *Eur. J. Biochem.* 1997, 250; 1-6, and *Eur. J. Biochem.* 1999, 264, 610-650; or periodical updates made to these publications respectively. More simply, an enzyme is any one of a number of proteins such as pepsin, lignin peroxidase, manganese peroxidase, amylase, protease, lipase, cellulose, laccase, lactases, originating from living cells or synthetically produced, that initiate or mediate the rate or outcome of any chemical reaction or change in a substance or its properties by catalytic action, as in digestion.

Infuse: To imbue, permeate, saturate, impregnate or steep with a particular substance or quality.

Wrap: A wrap is a covering material that may be composed of either an amorphous concretion, or coating that is built up around the surface of the apparatus to any desired thickness; or it may be one or more sheets of a pliable textile material composed of fibers or filaments that are assembled as a woven, knotted, knitted or felted matt. A wrap that is a coating in an amorphous concretion of hydrocarbon based material that is built up around the surface of the apparatus to any desirable thickness.

Fluid transfer device: A tube or any similar device that will allow for the transfer of fluids (liquids and/or gases) into the vessel cavity.

Bioremediation: Any process that uses microorganisms, fungi, green plants or their enzymes to return the environment altered by contaminants to its original condition. Bioremediation may be employed to attack specific soil contaminants, such as degradation of chlorinated hydrocarbons by bacteria. An example of a more general approach is the cleanup of oil spills by the addition of nitrate and/or sulfate fertilizers to facilitate the decomposition of crude oil by indigenous or exogenous bacteria.

Hydrocarbon: Any compound composed of carbon and hydrogen atoms with or without oxygen and with or without the substitution of other elements such as wood, where in those hydrocarbon compounds are primarily cellulose, hemi-cellulose, lignin and various polymerized sugar molecules.

Biodegradation: The complete or partial breakdown of organic compounds by living organisms into smaller compounds where the organisms transform the compounds through metabolic or enzymatic processes. Biodegradation processes vary greatly, but frequently the final product of the degradation is carbon dioxide, water or methane.

Media: The environment surrounding the apparatus; in some cases the apparatus will effect certain qualities or components of the media (environment surrounding the apparatus.)

Gas: Any biologically active gas or vapor including; oxygen, carbon dioxide, methane, nitrogen, hydrogen sulfide, water vapor, or any gas that is a pollutant capable of being metabolized.

Substantially: Possessing a sufficient degree, amount, or extent of composition or property falling within the range of 5% to 95% of the whole.

Covering: A layer of material of an appropriate depth protecting or connecting the apparatus to an array of said apparatus. Examples include straw, wood chips, compost and jute or other woven materials such as Agribon Remay.

Array or Grid: Pattern of placement of more than one apparatus. The pattern is not limited to any particular configuration.

What is claimed is:

1. An apparatus for the treatment of a media, said apparatus comprising:
   a vessel and a vessel cap attachable to said vessel;
   said vessel comprising a rigid or semi-rigid body comprised substantially of hydrocarbon compounds and
   a substantial portion of said vessel body is essentially impermeable to solids and fluids that are liquids
   said vessel body comprising:
     at least a first end, a second end and a length between said first and second end,
     a continuous cavity whereby the majority of the length of the vessel is hollow;
       said continuous cavity encompassing a substantial amount of a cross-sectional area of the vessel that contains the continuous cavity
     said first end comprising a vessel body opening to said cavity,
     said first end configured to accept said vessel cap;
   said vessel cap comprising:
     an essentially impermeable barrier capable of preventing the transfer of solids and fluids between the cavity and the media or an environment adjacent to the media, said essentially impermeable barrier having a first opening through which the transfer of fluids between the vessel cavity and an environment outside the vessel cavity can occur, and a fluid transfer device whereby a pathway for the transfer of fluids into or in the vicinity of the vessel body is provided;

wherein said vessel body is semi-permeable to fluids that are gases and comprised of a food source of hydrocarbon composition whereby said food source is sufficient to sustain the carbon metabolism of fungi, bacteria, enzymes or other selected prokaryotic or eukaryotic organisms, said food source comprising a substantial amount of the mass of the vessel.

2. The apparatus of claim 1 wherein the vessel body is inoculated with at least one catalyst from the group of catalysts including fungi, bacteria, enzymes or other selected prokaryotic or eukaryotic organisms whereby said vessel is infused with at least one catalyst from said group causing said at least one catalyst to grow on and spread by cellular multiplication, or by infusion, within and without the vessel, so as to invade the external media being treated and effect an increase in the porosity and receptivity of said external media resulting in the production of at least one enzyme or chemical compound from the group including proteins and enzymes that is transferred into the surrounding media or may be recovered for other uses.

3. The apparatus of claim 2 wherein:

at least said vessel cap or said vessel body comprises an additional opening whereby fluids can be transferred, and said apparatus comprises an external fluid supply whereby fluids can be introduced into said cavity.

4. The apparatus of claim 1 comprising a vessel wrap attachable to the outside of the vessel body, and said vessel wrap is comprised of a food source of hydrocarbon composition whereby said food source is sufficient to sustain the carbon metabolism of fungi, bacteria, enzymes or other selected prokaryotic or eukaryotic organisms, said food source comprising a substantial amount of the mass of the vessel wrap.

5. The apparatus of claim 4 wherein at least the vessel body or the vessel wrap is inoculated with at least one catalyst from the group of catalysts including fungi, bacteria, enzymes or other selected prokaryotic or eukaryotic organisms whereby said vessel is infused with at least one catalyst from said group causing said at least one catalyst to grow on and spread by cellular multiplication within and without the vessel, so as to invade the external media being treated and effect an increase in the porosity and receptivity of said external media resulting in the production of at least one enzyme or chemical compound from the group including proteins, lignin peroxidase, manganese peroxidase, amylase, protease, lipase, cellulose, laccase, lactases that is transferred into the surrounding media or may be recovered for other uses.

6. The apparatus of claim 5 wherein:

at least said vessel cap or said vessel body comprises an additional opening whereby fluids can be transferred, and said apparatus comprises an external fluid supply whereby fluids can be introduced into said cavity.

* * * * *